United States Patent [19]

Kanno et al.

[11] Patent Number: 4,794,641

[45] Date of Patent: Dec. 27, 1988

[54] DATA TRANSMISSION SYSTEM OF KEY TELEPHONE SYSTEM

[75] Inventors: Kenichi Kanno; Hisami Ojima; Senji Okumura, all of Tokyo, Japan

[73] Assignee: Tamura Electric Works, Ltd., Tokyo, Japan

[21] Appl. No.: 29,447

[22] Filed: Mar. 23, 1987

[30] Foreign Application Priority Data

Apr. 7, 1986 [JP] Japan .................................. 61-78364

[51] Int. Cl.$^4$ ......................... H04M 1/72; H04Q 3/00
[52] U.S. Cl. .................................................... 379/165
[58] Field of Search ............... 379/165, 164, 166, 156, 379/157, 181, 94, 32, 33

[56] References Cited

U.S. PATENT DOCUMENTS

| | | |
|---|---|---|
| 4,181,909 | 1/1980 | Pyeatte .................................... 379/94 |
| 4,514,597 | 4/1985 | Kikuchi et al. . |
| 4,551,583 | 11/1985 | Sekiguchi .......................... 379/164 |
| 4,564,726 | 1/1986 | Ibata . |
| 4,583,214 | 4/1986 | Miyashita .......................... 379/166 |

FOREIGN PATENT DOCUMENTS

| | | | |
|---|---|---|---|
| 0053291 | 3/1983 | Japan ................................. | 379/165 |
| 0214188 | 10/1985 | Japan ................................. | 379/156 |

*Primary Examiner*—Jin F. Ng
*Assistant Examiner*—Wing F. Chan
*Attorney, Agent, or Firm*—Perman & Green

[57] ABSTRACT

A system for transmissing data by a pulse signal through a pair of lines connected between a main unit and a key telephone set is disclosed. The main unit includes a transmitter for sending, prior to transmission of pulse train data, a start signal of a pulse train including a pulse of an n-bit (where n is an integer) specific logic value and a pulse of an (n+1)-bit logic value opposite to the specific logic value. The key telephone set includes a change detector for detecting a change in the pulse train of the start signal in a direction of the logic value opposite to the specific logic value, a logic value detector for detecting a logic value of an (n+1)th bit pulse from a detection timing of the change detector, a discriminator for discriminating on the basis of the logic value of the (n+1)th bit pulse whether a line connection for the key telephone set is normal, and a reader for reading data following the start signal according to a logic determined by a discrimination result.

8 Claims, 5 Drawing Sheets

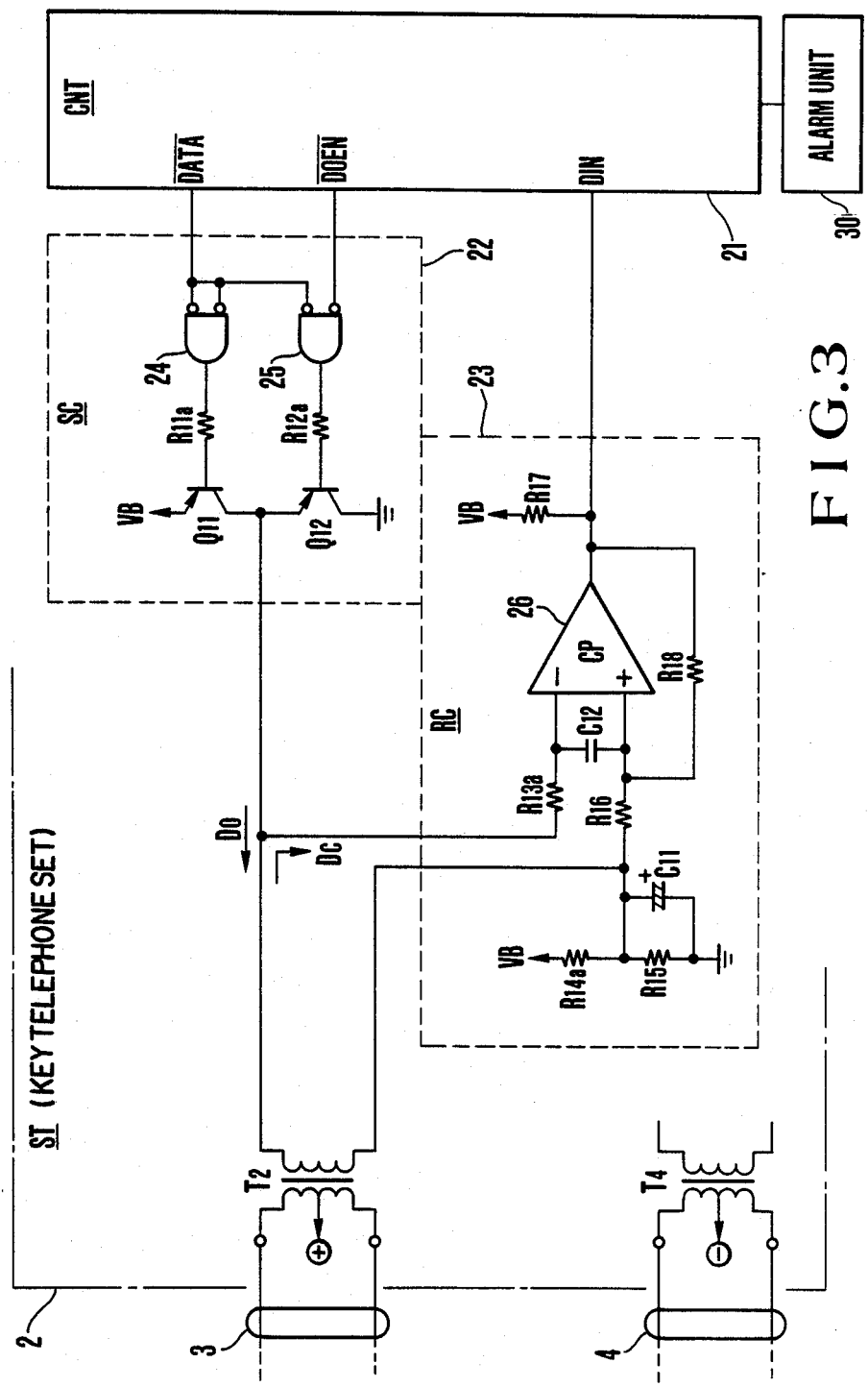
F I G. 3

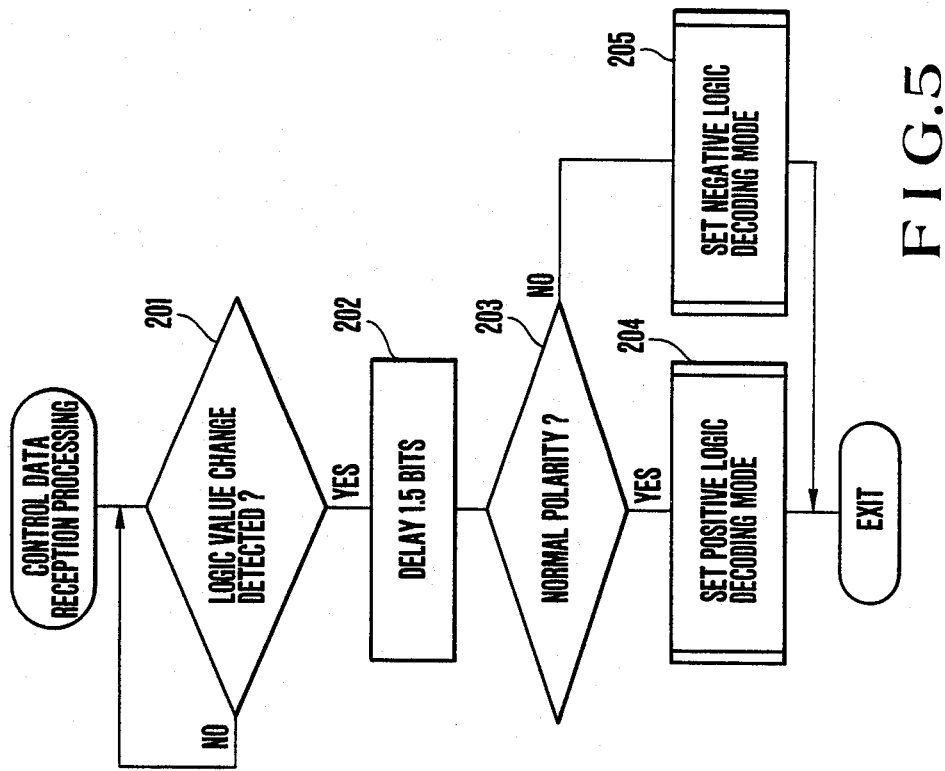
F I G. 5
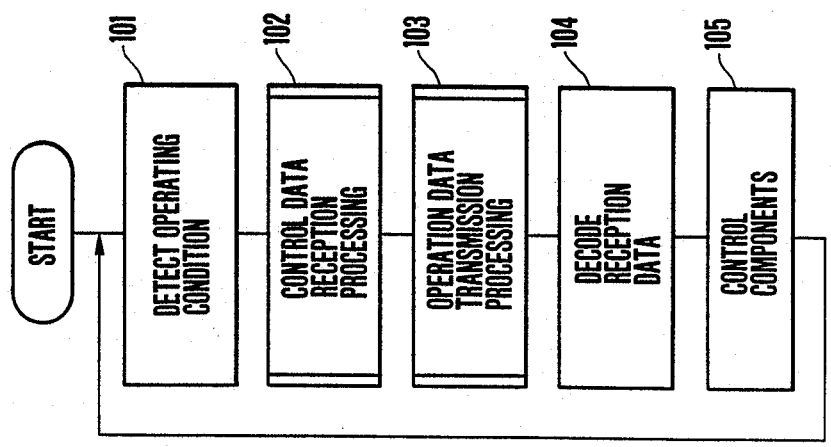
F I G. 4

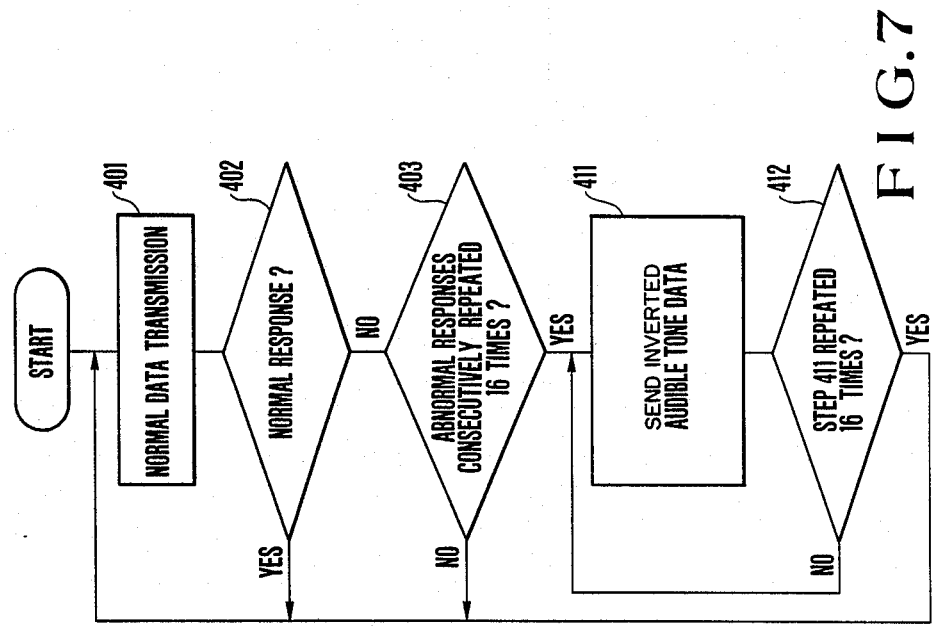
F I G. 7
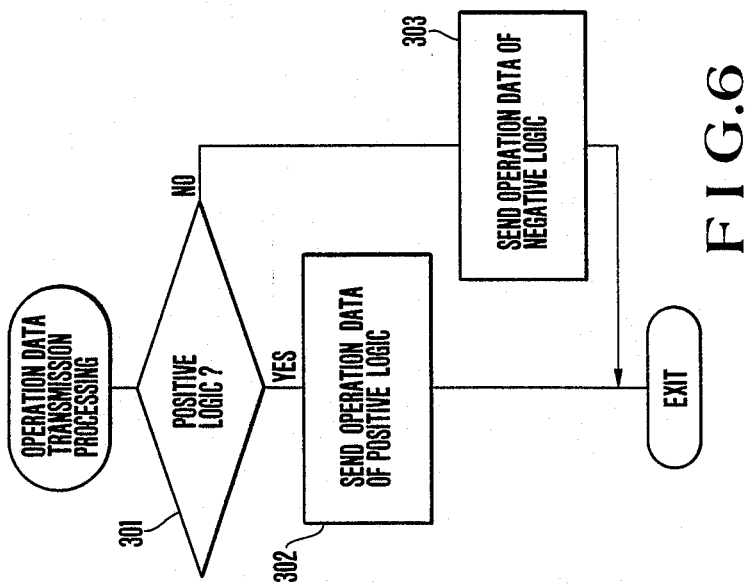
F I G. 6

DATA TRANSMISSION SYSTEM OF KEY TELEPHONE SYSTEM

BACKGROUND OF THE INVENTION

The present invention relates to a data transmission system of a key telephone system, which allows data transmission between a main unit and a key telephnne set by a pulse signal.

In a conventional key telephone system, a main unit is connected to each key telephone set through a pair of signal lines and a pair of speech lines, and a coded pulse signal is transmitted through the signal lines. Control data is sent from the main unit to the key telephone set, and operation data is sent from the key telephone set to the main unit, thereby achieving switching and various control operations of the key telephone system.

The pulse signal has a polarity in the conventional key telephone system. If an error occurs in connection polarities of the signal lines, the polarity of the signal received by the main unit or the key telephone set is inverted. The decoded content is inaccurate, and switching and various control operations are undesirably disturbed.

SUMMARY OF THE INVENTION

It is, therefore, a principal object of the present invention to provide a data transmission system of a key telephone system, wherein data can be accurately decoded to eliminate operation errors regardless of connection polarities of signal lines.

In order to achieve the above object of the present invention, there is provided a system for transmitting data by a pulse signal through a pair of lines connected between a main unit and a key telephone set, wherein the main unit comprises means for sending, prior to transmission of pulse train data, a start signal of a pulse train including a pulse of an n-bit (where n is an integer) specific logic value and a pulse of an (n+1)-bit logic value opposite to the specific logic value; and the key telephone set comprises change detecting means for detecting a change in the pulse train of the start signal in a direction of the logic value opposite to the specific logic value, logic value detecting means for detecting a logic value of an (n+1)th bit pulse from a detection timing of the change detecting means, discriminating means for discriminating on the basis of the logic value of the (n+1)th bit pulse whether a line connection for the key telephone set is normal, and reading means for reading data following the start signal according to a logic determined by a discrimination result.

According to the present invention, hhe connection polarities of the lines for a key telephone set can be automatically discriminated, and the received signal can be decoded. At the same time, selection of the positive or negative logic for the transmission signal transmitted to the main unit can be performed. Therefore, the decoded contents can be accurate regardless of the connection polarities of the signal lines, and connection errors can be eliminated.

BRIEF DESCRIPTION OF THE DRAWINGS

FIG. 3 is a circuit diagram of a transmitter and a receiver in a key telephone set in the data transmission system of the key telephone system;

FIG. 4 is a flow chart showing the main routine under the control of a control circuit in the key telephone set;

FIGS. 5 and 6 are flow charts showing subroutines in the main routine shown in FIG. 4; and FIG. 7 is a flow chart showing transmission control conditions according to a modification of the present invention.

DESCRIPTION OF THE PREFERRED EMBODIMENT

The present invention will be described in detail with reference to the accompanying drawings.

Figure 1A:
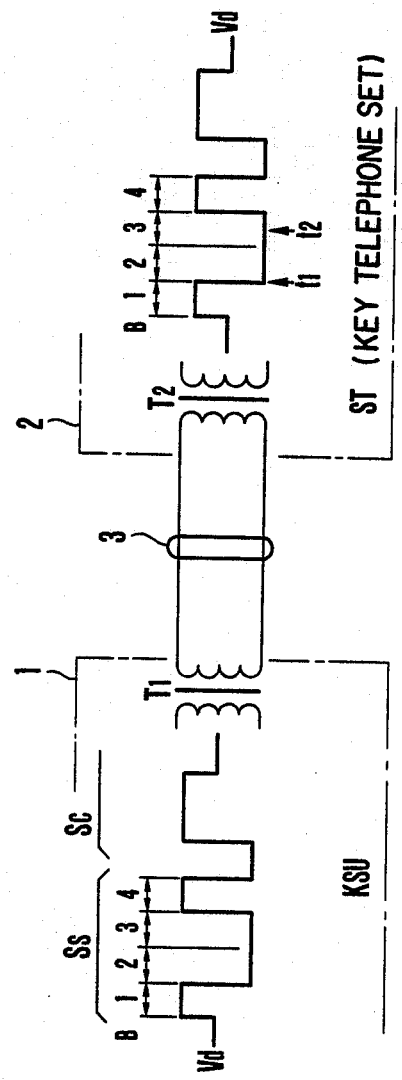
FIGS. 1A and 1B are schematic views showing pulse signal transmission conditions, respectively.
Figure 1B:
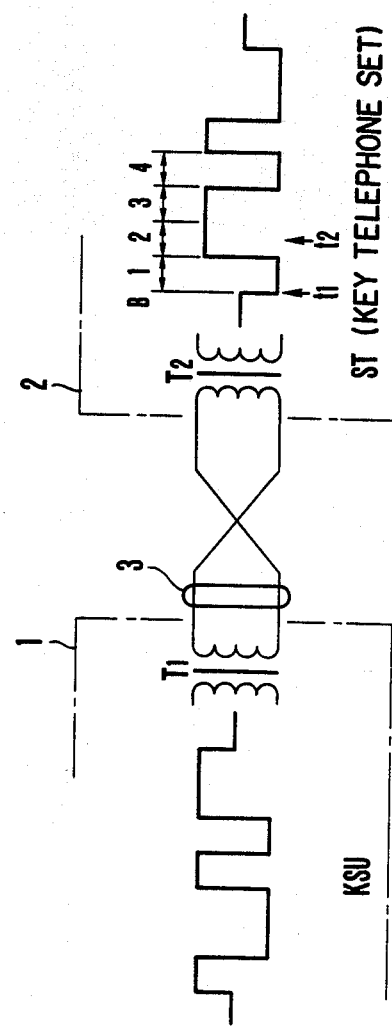

FIGS. 1A and 1B show pulse signal transmission conditions. A main unit (to be referred to as a KSU hereinafter) 1 and a key telephone set (to be referred to as an ST hereinafter) 2 are connected to each other through line transformers T1 and T2 and a pair of signal lines 3. FIG. 1A shows the normal polarity of connection conditions, and FIG. 1B shows a polarity opposite to the normal polarity. The waveform of the signal received by the ST 2 in FIG. 1B is inverted from that in FIG. 1A.

When control data is sent from the KSU 1, a 4-bit start signal Ss including a positive bit B1 as a specific logic value bit for a reference voltage Vd nnd consecutive negative bits B2 and B3 as a plurality of bits of opposite logic value is sent. A bit B4 is a supplementary bit. A change in logic value of bit B1 is detected by a change in voltage in the negative direction at time t1. The polarity of the bit B2 sent at time t2 delayed by, e.g., 1.5 bits from time t1 is detected, and if the polarity of the bit B3 is negative, as shown in FIG. 1A, the connection polarity of the signal lines 3 is determined to be the normal polarity. However, if the polarity of the bit B2 is positive, as shown in FIG. 1B, the connection polarity of the signal lines 3 is an opposite polarity. A control data signal Sc following the start signal Ss in the case of FIG. 1A is decoded by the positive logic. However, the control data signal Sc in the case of FIG. 1B is decoded by the negative logic. When an operation data signal is sent to the KSU 1, the positive or negative logic of the transmitted signal is selected according to the decoding logic in the case of FIG. 1A or 1B.

If the connection condition of the signal lines 3 is given as the normal polarity, the positive and negative values of the transmission and reception signals are used without polarity inversion. However, if the connection condition represents the opposite polarity, the logic values of the signals are inverted. In either case, the identical result can be obtained, and an operation error is not caused.

Figure 2:
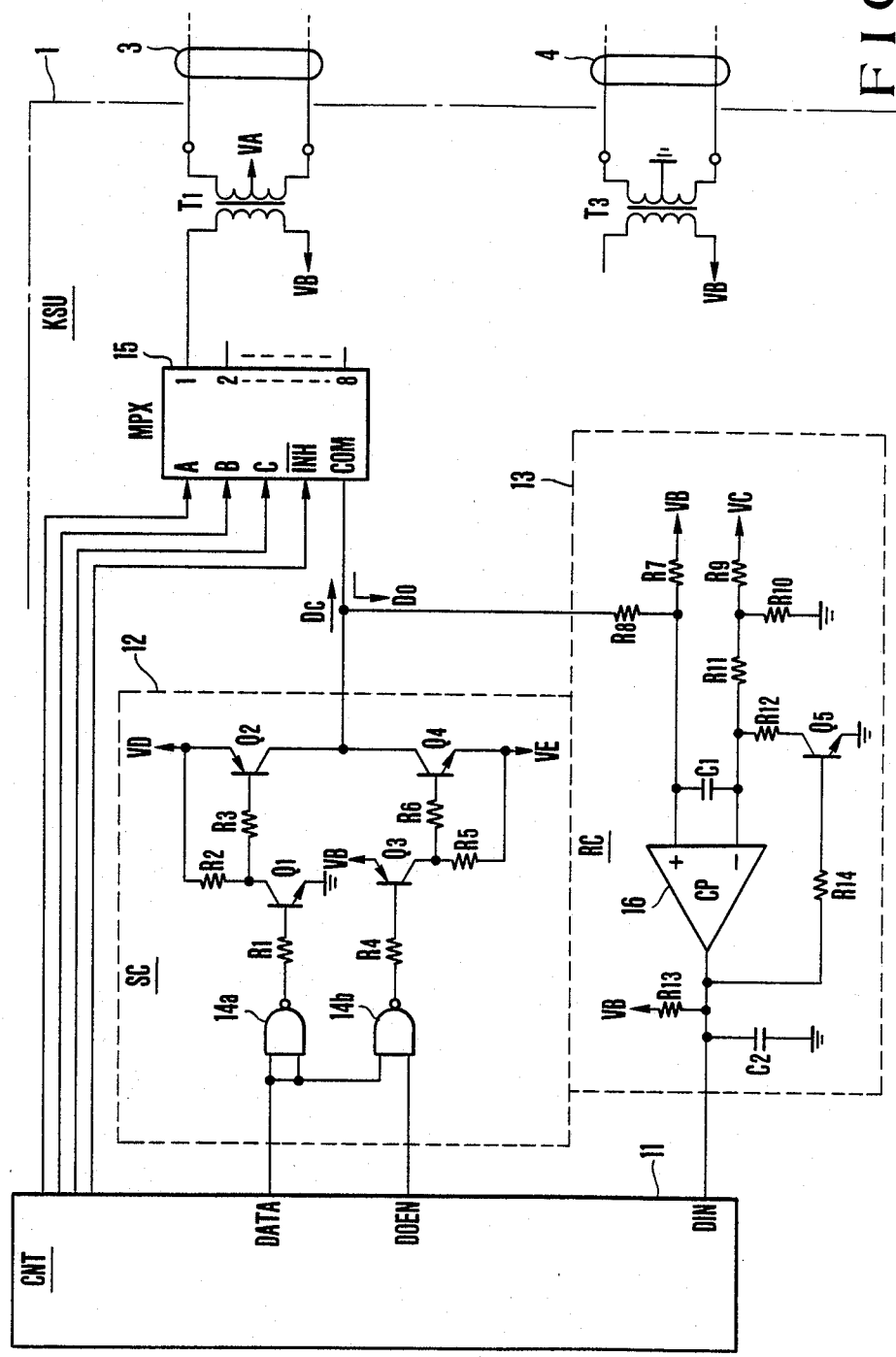
FIG. 2 is a circuit diagram of a transmitter and a receiver in a main unit in a data transmission system of a key telephone system.

FIG. 2 shows a transmitter and a receiver in the KSU 1 constituting a key telephone system. A control circuit (to be referred to as a CNT hereinafter) 11 including a microprocessor and a memory controls a transmitter (to be referred to as a SC hereinafter) 12 and receives data from a receiver (to be referred to as an RC hereinafter) 13. When control data is sent to the ST 2, the CNT 11 outputs "H" control data for controlling SC12 from a terminal DOEN and outputs a start signal and control data for transmitting them from a terminal DATA to ST2. The start signal and the control data are inverted by a NAND gate 14a in the SC 12. The inverted data is applied to the base of a transistor (to be referred to as a TR hereinafter) Q1 through a resistor R1. The collector voltage of the TR Q1 applied with a positive power source voltage VD through a resittor R2 repeats "L" and "H" in response to the ON and OFF operations of the TR Q1. The collector voltage is applied to the base of a TR Q2 through a resistor R3, and thus the TR Q2 repeats the ON and OFF operations in synchronism with the TR Q1.

A NAND gate 14b is enabled in response to the "H" control signal from a terminal DOEN only while the output of terminal DATA is sent to ST2 and gates the start signal and the control data from terminal DATA. At the same time, outputs of a NAND gate 14b is inverted, and the inverted data is applied to the base of a TR Q3 through a resistor R4. The ON/OFF timing of the TR Q3 is opposite to that of the TR Q1. The collector voltage connected to a negative power source voltage Ve through a resistor R5 is sequentially set at "L" and "H". The collector voltage is applied to the base of a TR Q4 through a resistor R6. The ON/OFF timing of the TR Q4 is synchronized with that of the TR Q3 and is complementary to that of the TR Q2.

Therefore, during data transmission for ST2, that is, when the terminal data is "H", if the terminal DATA is set at "L", the TR Q2 is ON, and the TR Q4 is OFF. A complementary single ended push-pull output stage constituted by the TRs Q2 and Q4 causes the common collector node of the TRs Q2 and Q4 to set at "H". However, if the terminal DATA is set at "H", the TR Q2 is turned off and the TR Q4 is turned on. In this case, the common node is set at "L". In response to changes in logic levels "H" and "L" of the terminal DATA, the common node is sequentially set at "L" and "H". Changes in voltages are supplied as positive- and negative-direction transmission pulses to a common terminal COM of a multiplexer (to be referred to as an MPX hereinafter) 15.

A switching signal is supplied from the CNT 11 to selection terminals A to C of the MPX 15. An inhibition signal is supplied to an inhibition termnnal $\overline{INH}$ of the MPX 15. When the iniibition signal is not supplied to the terminal $\overline{INH}$, output terminals 1 to 8 are sequentially selected in response to the switching signal, and control data Dc from the SC 12 is sent onto a signal line 3 through a line transformer T1 arranged in correspondence with each ST 2. At the same time, operation data Do from each ST 2 is supplied to the RC 13 through the line in a direction opposite to the transmission direction of the control data Dc.

A line transformer T1 for the signal lines 3 and a line transformer T3 for speech lines 4 are arranged in units of STs 2. Each winding on the transmission line side has a center tap. A power source VA and a common circuit are connected to each line transformer T1 or T2. A phantom voltage is supplied to each ST 2 through the signal and speech lines 3 and 4.

The pulsed start signal and the pulsed control data repeating the "H" and "L" levels and the operation data are superposed on the DC power source voltage. If the control data represents an "H" pulse, a positive polarity is discriminated. A negative polarity is discriminated in response to the "L" pulse. For example, "H" represents logic level "1", and "L" represents logic level "0".

When the operation data is supplied to the RC 13 while the SC 12 does not transmit data and the TRs Q2 and Q4 are thus kept off, operation data Do is supplied to the noninverting input terminal of a comparator (to be referred to as a CP hereinafter) 16 through a resistor R8. The operation data Do is compared with a reference voltage supplied to the inverting input terminal of the CP 16. Note that, in this case, a voltage from a power source VB is supplied to the CP 16 through a resistor R7.

A voltage from a power source VC is applied to the inverting input terminal of the CP 16 through a voltage divider consisting of resistors R9 to R12. The voltage from the power source VB is applied to the output terminal of the CP 16 through a resistor R13. The output from the CP 16 is normally kept "H". The "H" output from the CP 16 drives a TR Q5 through a resistor R14. A reference voltage obtained by dividing the voltage from the power source VC by the resistors R9 to R12 is applied to the inverting input terminal of the CP 16.

For this reason, if the operation data is higher than the reference voltage, the output from the CP 16 is kept "H". However, if the voltage represented by the operation data is lower than the reference voltage, the output from the CP 16 goes to "L", and thus the TR Q5 is turned off. The voltage division action of the resistors R11 and R12 is cancelled, and the reference voltage is increased. The "L" output is kept until the voltage represented by the operation data is reduced.

Switching of the reference voltage level prevents the CP 16 from a detection error due to a noise mixture and distortion of reference level of the transmission waveform, the change being caused by the characteristics of the line transformer T1 inserted across the signal lines 3 and by distributing capacitance of the signal lines 3.

Changes in voltages of the operation data are detected as a repetition of "H" and "L" by the CP 16. This output from the CP 16 is supplied to a terminal DIN of the CNT 11 to allow the CNT 11 to decode the operation data. Control is performed according to the decoded contents. At the same time, control data is generated.

A capacitor C1 inserted across the input terminals of the CP 16 and a capacitor C2 connected to the output terminal of the CP 16 serve to reduce noise components.

FIG. 3 shows a transmitter and a receiver in the ST 2. This circuit arrangement is similar to that of the CNT 11 in the KSU 1. However, the scale of a CNT 21 in the ST 2 is smaller than that of the CNT 11, thereby controlling an SC 22 and receiving data from an RC 23. The SC 22 comprises a complementary single ended push-pull output stage of TRs Q11 and Q12, and NAND gates 24 and 25 in the same mannr as in the SC 12 in the KSU 1. When operation data is sent, an "L" control signal appears at a terminal $\overline{DOEN}$ of the CNT 21 add operation data repeating "L" and "H" appears at a terminal DATA of the CNT 21. If the operation data represents "L", this data is inverted by the NAND gate 24 into an "H" signal. The "H" signal disables a TR Q11 through a resistor R11a. In response to the "L" control signal, the NAND gate 25 is turned on. An output from the CNT 21 goes to "H" to turn on a TR Q12 through a resistor R12a. A common collector node between the TRs Q11 and Q12 goes to "L", and then the operation data goes to "H" at the terminal $\overline{DATA}$. Outputs from the NAND gates 24 and 25 are set at "L". In this case, the TRs Q11 and Q12 are turned on and off, respectively, and the common node is set at "H".

A change in voltage at the common node appears as a transmission signal of the operation data Do onto the signal lines 3 through a line transformer T2.

One end of the secondary winding of the line transformer T2 is connected to the common collector node in the SC 22 and to a CP 26 in the RC 23 through a resistor R13a. The other end of the secondary winding of the line transformer T2 is connected to a voltage division output terminal of a voltage divider consisting of resistors R14a and R15 in the RC 23. The "H" and "L" levels of the transmission signals are determined with respect to the divided voltage and are sent as positive- and negative-polarity signals to the KSU 1.

In the nontransmission mode wherein both TRs Q11 and Q12 in the SC 22 are kept off, when control data Dc is sent to the ST 2, the data Dc is supplied to the inverting input terminal of the CP 26 through the resistor R13a and is compared with the reference voltage supplied to the noninverting input terminal of the CP 26 through a resistor R16.

The voltage from the power source VB is supplied to the output terminal of the CP 26 through a resistor R17. In the normal mode, the output from the CP 66 is kept "H". A positive feedback rssistor R18 is connected between the output terminal and the noninverting input terminal of the CP 26. The CP 26 receives a reference voltage consisting of the divided voltage and an output voltage through a resistor R18.

For this reason, if the output from the CP 26 is set at "H", the reference voltage is increased. However, if the output from the CP 26 is set at "L", the reference voltage is reduced in the same manner as in the RC 13 in the KSU 1.

If a voltage represented by the control data is higher than the high reference voltage, the output from the CP 26 goes to "L". The reference voltage is decreased accordingly. However, if the voltage represented by the control data is lower than the refsrence voltage, the output from the CP 26 is set at "H", thereby increasing the reference voltage. The control data is detected as "H" (negative) and "L" (positive) changes which represent the positive- and negative-direction bits. These bits are supplied to the terminal DIN of the CNT 21 and are decoded to control the constituting components.

A capacitor C11 connected in parallel with a resistor R15 is arranged for an AC component line, and a capacitor C12 connected across the input terminals of the CP 26 serves to eliminate noise components.

A center tap is formed in the winding of the signal/speech line side of each of line transformers T2 and T4 in the same manner as in the KSU 1. Power source voltages $\oplus$ and $\ominus$ are extracted from the center taps, respectively. These voltages are stabilized by a power source circuit (not shown) and the stabilized voltages are supplied to the corresponding components.

FIG. 4 shows an overall flow chart showing control conditions of the CNT 21 in the ST 2. A processor (to be referred to as a CPU hereinafter) in the CNT 21 executes an instruction in a memory while accessing necessary data with respect thereto. Outputs from a hook switch, dial keys, and various function keys are sequentially scanned and detected in step 101. Control data from the RC 23 is received in step 102. Operation data transmission processing on the basis of step 101 is performed in step 103. The SC 22 is controlled, and the received data ss decoded in step 104. The components are then controlled on the basis of the decoded data in step 105 in such a manner that the corresponding indicators flash and a speech path is controlled. The operations in step 101 and the subsequent steps are repeated for every given interval.

FIG. 5 shows a detailed flow chart of step 102. The CPU determines in step 201 at time t1 whether the logic value is changed. If YES in step 201, a soft counter in the CPU counts clock pulses to cause 1.5-bit delay in step 202. The flow advances to step 203 to determine whether the normal polarity is detected. If YES in step 203, the positive logic decoding mode is set in step 204 by setting a positive logic decoding flag or the like. However if NO in step 203, the negative logic decoding mode is set in step 205 by setting a negative logic eecoding flag.

When the change in logic value from "H" to "L" of the bit B1 of the start signal (FIG. 1) supplied to the terminal DIN in the CNT 21 is detected in step 201, the ppolarity (i.e., "H" or "L") of the bit B3 or B2 is determined when a 1.5-bit period has elapsed in step 203. If the bit B3 or B2 is determined to be set at "L", the CPU determines that line connections for the key telephone set are normal. However, if the bit B3 or B2 is determined to be set at "H", the CPU determines that the line connections for the key telephone set are abnormal. The setting operation in step 204 or 205 is performed on the basis of the decision in step 203. Control data reception processing is ended and returns to the main routine. The reception data is decoded in step 104 in FIG. 4, and proper control is performed on the basis of the decoded contents of the control data.

FIG. 6 is a detailed flow chart in step 103. In response to the operation in step 204 or 205, the CPU determines in step 301 whether the positive logic is used. If YES in step 301, the operation data is sent out according to the positive logic in step 302. However, if NO in step 301, the operation data is sent out according to the negative logic in step 303.

If the connection polarity of the signal line 3 is the normal polarity, the CPU sends the operation data to the terminal $\overline{\text{DATA}}$ of the CNT 21 without inverting the "H" and "L" values. However, if the connection polarity is the abnormal polarity, the "H" and "L" values of the operation data are inverted, and the inverted data is sent out, thereby allowing the KSU 1 to accurately decode the operation data.

As shown in FIGS. 1A and 1B, the control data can be accurately decoded in the ST 2 and the operation data can be accurately decoeed in the KSU 1 regardless of the connection polarities of the signal lines 3. As a result, operation errors do not occur throughout the key telephone system, and special attention need not be paid for the connection polarities of the signal lines 3. Therefore, installation operations of the key telephone system can be simplified.

The speech lines 4 send an AC component. Even if an error in connection polarity occurs, no problem is presented.

The polarity of the bit B1 in the start signal may be opposite to that of the bits B2 and B3. In addition, the bit B1 may be replaced with a plurality of bits, and the bits B2 and B3 may be three or more bits. Detection time t1 and detection time t2 are determined according to the polarities and numbers of bits. The delay time from time t1 to time t2 may be arbitrarily determined if polarity detection can be properly performed.

The present invention is applicable not only to the case wherein the the pulse signal is superposed on a DC voltage and sent but also to the case wherein only the pulse signal having polarities is sent. The CNTs 11 and 21 need not be constituted by CPUs, but may be constituted by various logic circuits. The arrangements of SCs 12 and 22 and the RCs 13 and 23 may be arbitrarily modified according to the given conditions.

According to the present invention as described above, the pulsed data signal having polarities can be accurately decoded regardless of the connection polarities of the pair of signal lines, and operation errors can be eliminated. A good practical effect can be obtained in various types of key telephone systems.

The present invention is not limtted to the above embodiment. Various changes and modifications may be made. For example, if NO in step 203, the CNT 21 can cause an alarm unit (FIG. 3) 30 to drive to generate an alarm tone, instead of performing the operation in step 205, thereby causing a person who is located near the telephone set, e.g., a person in charge of work to invert the connections.

In the above embodiment, the specific logic value pulse comprises one bit, and opposite logic value pulses comprise two bits. In general, the former pulse may comprise n bits (where n is an integer) and the latter pulse may be n+1 bits so as to obtin the same effect as described above.

In the key telephone set in the above embodiment, a connection state of the lines for the key telephone set is discriminated to be normal or not. However, this discriminator may be arranged in the main unit. In this case, a start signal is sent from the main unit to the key telephone set prior to data transmission. The start signal may be a combination of a specific logic value and a value opposite to the specific logic value in the same manner as in the above embodiment. However, the start signal may be a single pulse. If the line connection is normal, such a start signal and the data are received by the key telephone set. The telephone set sends a response signal to the main unit. The main unit receives the response signal and detects that the line connection is normal. In this case, if the line connection state is abnormal, the response signal is not sent from the key telephone set to the main unit.

The discriminating means in the main unit discriminates an abnormal line connection or a disconnection of the key telephone set when the response signal is not received consecutively for a predetermined number of times. The discriminating means inverts the polarity of an audible tone data pulse and sends the inverted data to the key telephone set.

When the line connection is discriminated to be abnormal, the inverted and sent audible tone data is received by the key telephone set and an audible tone is generated, thereby signalling to the person in charge of work that the present connection is abnormal.

FIG. 7 is an operation flow chart for signalling the polarity connection error of the key telephone set to the person in charge of work at the power ON time after the key telephone system is installed. A door incoming tone is used as an alarm tone to cause the key telephone set to generate an inter (ON for one second and OFF for one second) until the connection error is eliminated.

Normal control data (noninverted) and the inverted audible tone data are continuously transmitted by 16 times each under the condition that one polling cycle is defined as about 10 ms until the connection error is eliminated. The polling time of the control data transmitted by 16 times constitute an OFF time of about one second, and the polling time of the audible tone data transmitted 16 times constitutes an OFF time of about one second. Therefore, the timings of the alarm tone are determined such that it is produced for one second and is not produced for the next one second. More particularly, FIG. 7 is a flow chart for explaining the transmission control conditions of the CPU in the CNT 11 in the KSU 1. This program is executed upon energization of the KSU 1. The normal data is sent under the control of the SC 12 in step 401. A response signal is detected on the basis of an output from the RC 13 so as to cause the CPU to determine in step 402 whether the response is normal. If NO in step 402, the operations in steps 403 and 401 are repeated until the CPU determines in step 403 that 16 errors are consecutively counted by a counte arranged in the CPU. If YES in step 403, the transmission is not confirmed. In this case, the polarity of the audible tone data is inverted, and the inverted audible tone data is transmitted in step 411. If in decision block (step 412) the CPU determines that the operations in step 411 has not repeated 16 times, then the operations in step 411 are repeated 16 times. If YES in step 412, the operations in step 401 and the subsequent steps are repeated.

In step 411 of FIG. 7, the polarity of the audible tone data is inverted, and an alarm tone such as a door phon incoming tone or the like produced in the ST 2 is sent thereto. Upon reception of the inverted audible tone data, the ST 2 generates the door phone incoming tone as an alarm tone under the control of the CNT 21 at a loudspeaker. Therefore, the person in charge of work can easily find the connection polarity errors of the signal lines 3 or can quickly notice them.

Even after the connection polarity is changed to be normal and the operation in step 411 is repeated, normal data cannot be transmitted. After the operation in step 411 is repeated 16 times, the flow returns to step 401. The operation in step 402 is repeated 16 times.

If the connection polarity is set to be normal, the alarm tone is not generated, and the normal condition of the connection polarity can be confirmed.

If the ST 2 is not connected, the response signal is not sent back. It is impossible to cause the KSU 1 to discriminate the inverted polarity connection or the disconnection of the ST. However, in the case of disconnection of the ST, no alarm tone is generated, thus eliminating any trouble.

Control of FIG. 7 is continuously performed in units of STs 2 by polling. If the number of STs 2 is 16, the operation in each of steps 401 and 411 is repeated for about 1 sec. to generate a 1-sec ON and 1-sec OFF alarm tone:

Polling Cycle×16≈1 sec

The alarm tone may be a holding tone, an external ringing tone, and an extension ringing tone, in plac of the door phone incoming tone. The inverted audible tone data sent from the KSU 1 is determined according to the type of alarm tone data. In FIG. 7, the number of operations in each of steps 403 and 412 can be arbitrarily determined.

What is claimed is:
1. A system for transmitting data by a pulse signal through lines connecting a main unit and a key telephone set, wherein
said main unit comprises means for sending, prior to transmission of pulse train data, a start signal of a pulse train including a pulse of an n-bit (where n is an integer), first logic vlaue and a pulse of an (n+1)-bit, second logic value; and said key telephone set comprises logic value change detecting means for detecting a change in the pulse train of the start signal from said first logic value to said second logic value;

polarity discriminating means for discriminating on the basis of the logic value of the pulse of the (n+1)th bit from the logic value change detected bit, whether or not a line connection for said key telephone set is normal, and decoding means for decoding said pulse train data acording to a predetermined logic, depending on the result of said discrimination.

2. A system according to claim 1, wherein said key telephone set further comprises means for determining a logic of transmission from said key telephone set to said main unit on the basis of the discrimination result.

3. A system according to claim 1, wherein n=1.

4. a system according to claim 1, a detection timing of said logic value detecting means is delayed by a predetermined period of time from the detection timing of said change detecting means.

5. A system according to claim 1, further comprisnng alarm generating means for generating an alarm tone when said discriminating means determines that the line connection for said key telephone set is not normal, that is, abnormal.

6. A system for transmitting data by a pulse signal through lines connecting a main unit and a key telephone set, wherein said main unit comprises measn for transmitting a start signal prior to transmission of a data pulse train, and discriminating means for discriminating a state of the line connection for said key telephone set accoridng to the presence/absence of a response signal sent back from said key telephone set; and said key telephone set comprises sending means for sending back a response signal to said main unit upon reception of the data pulse train, and alarm generating means motivated based on audible tone data from said main unit;

said discriminating means being adapted to invert audible tone data set to said key telephone set and send said inverted data to said key telephone set when the response signal is sent back from said key telephone set after said main unit transmits the start signal and the subseqeunt data pulse train, and to drive said alarm generating means arranged in said key telephone set.

7. A system according to claims 6, wherein said main unit repeats to transmit the start signal and the subsequent data in a next polling cycle when said discriminating means does not receive the response signal.

8. A system according to claim 7, wherein said main unit transmits the audible tone data when said main unit does not consecutively receive the response signal a plurality of times.

* * * * *

UNITED STATES PATENT AND TRADEMARK OFFICE
CERTIFICATE OF CORRECTION

PATENT NO. : 4,794,641

DATED : December 27, 1988

INVENTOR(S) : Kanno et al.

It is certified that error appears in the above—identified patent and that said Letters Patent is hereby corrected as shown below:

Column 8, line 67, change "Vlaue" to --Value--.

Column 9, line 18, after "claim 1" insert --wherein--.

Column 9, line 22, change "comprisinng" to --comprising--

Column 10, line 1, change "measn" to --means---.

Column 10, line 5, change "accoridng" to --according----.

Column 10, line 14, change "set" (first occurrence) to --sent--.

Signed and Sealed this

Eleventh Day of July, 1989

*Attest:*

DONALD J. QUIGG

*Attesting Officer*  *Commissioner of Patents and Trademarks*